US008270625B2

(12) United States Patent
Sommerfeldt et al.

(10) Patent No.: US 8,270,625 B2
(45) Date of Patent: Sep. 18, 2012

(54) SECONDARY PATH MODELING FOR ACTIVE NOISE CONTROL

(75) Inventors: Scott D. Sommerfeldt, Mapleton, UT (US); Jonathan Blotter, Heber City, UT (US); Benjamin M. Faber, Spanish Fork, UT (US)

(73) Assignee: Brigham Young University, Provo, UT (US)

( * ) Notice: Subject to any disclaimer, the term of this patent is extended or adjusted under 35 U.S.C. 154(b) by 1287 days.

(21) Appl. No.: 11/951,945

(22) Filed: Dec. 6, 2007

(65) Prior Publication Data

US 2008/0144853 A1 Jun. 19, 2008

Related U.S. Application Data

(60) Provisional application No. 60/873,362, filed on Dec. 6, 2006.

(51) Int. Cl.
*G10K 11/04* (2006.01)
*G05B 13/02* (2006.01)
*G10K 11/00* (2006.01)

(52) U.S. Cl. .................... 381/71.12; 381/71.4; 700/280; 700/30; 706/13; 708/322; 708/404

(58) Field of Classification Search ............... 381/71.12, 381/71.2, 71.4, 71.8, 71.11, 71.14, 94.1, 381/94.2, 94.3, 94.9; 700/280, 28–33; 706/12, 706/13; 708/322, 300, 400, 404
See application file for complete search history.

(56) References Cited

U.S. PATENT DOCUMENTS 5,359,662 A 10/1994 Yuan et al.
5,416,845 A * 5/1995 Qun .......................... 381/71.12
5,502,770 A 3/1996 Kuo et al.
5,940,519 A 8/1999 Kuo
5,991,418 A 11/1999 Kuo
6,094,601 A * 7/2000 Popovich ........................ 700/28
6,198,828 B1 3/2001 Kuo
6,418,227 B1 7/2002 Kuo
7,327,849 B2 * 2/2008 Sommerfeldt et al. ....... 381/71.7
7,663,502 B2 * 2/2010 Breed ........................ 340/12.25
7,885,417 B2 * 2/2011 Christoph .................. 381/71.11

(Continued)

OTHER PUBLICATIONS

Sen M. Kuo, Analysis and Design of Narrowband Active noise Control Systems, Department of Electrical Engineering Northern Illinois University De Kalb, IL 60115 p. 3557-3560, 1998 IEEE.

*Primary Examiner* — Edgardo San Martin
(74) *Attorney, Agent, or Firm* — Thorpe North & Western LLP

(57) ABSTRACT

Methods for modeling the secondary path of an ANC system to improve convergence and tracking during noise control operation, and their associated uses are provided. In one aspect, for example, a method for modeling a secondary path for an active noise control system is provided. Such a method may include receiving a reference signal, filtering the reference signal with an initial secondary path model to obtain a filtered reference signal, calculating an autocorrelation matrix from the filtered reference signal, and calculating a plurality of eigenvalues from the autocorrelation matrix. The method may further include calculating a maximum difference between the plurality of eigenvalues and iterating a test model to determine an optimized secondary path model having a plurality of optimized eigenvalues that have a minimized difference that is less than the maximum difference of the plurality of eigenvalues, such that the optimized secondary path model may be utilized in the active noise control system.

15 Claims, 3 Drawing Sheets

U.S. PATENT DOCUMENTS

| | | | | |
|---|---|---|---|---|
| 2008/0181422 | A1* | 7/2008 | Christoph | 381/73.1 |
| 2008/0224863 | A1* | 9/2008 | Bachmann | 340/541 |
| 2008/0317256 | A1* | 12/2008 | Bachmann | 381/71.11 |
| 2009/0080666 | A1* | 3/2009 | Uhle et al. | 381/17 |
| 2009/0271187 | A1* | 10/2009 | Yen et al. | 704/226 |
| 2010/0014685 | A1* | 1/2010 | Wurm | 381/71.11 |

* cited by examiner

SECONDARY PATH MODELING FOR ACTIVE NOISE CONTROL

PRIORITY DATA

This application claims the benefit of U.S. Provisional Patent Application Ser. No. 60/873,362, filed on Dec. 6, 2006, which is incorporated herein by reference in its entirety.

FIELD OF THE INVENTION

The present invention relates generally to active noise control modeling in acoustic systems. Accordingly, the present invention involves the mathematical and acoustic science fields.

BACKGROUND OF THE INVENTION

Undesirable noise has long been a problem in a variety of environments, including those associated with travel and working. Many of these environments generate repetitive noise or vibration that can become extremely annoying over time. One example of such an environment includes the engine sound from a plane or train during travel. In some cases, particularly those involving work environments, daily repeated exposure to undesirable noise may lead to work fatigue and other more serious medical conditions.

Active noise control (ANC) systems attempt to moderate the effects of undesirable noise by canceling at least a portion of such noise through the use of a secondary noise signal. The secondary noise signal thus interferes with and cancels much of the undesirable noise in the environment. So for many ANC systems, the undesirable noise is detected in the environment, and a secondary noise signal is generated of equal or similar amplitude and opposite phase. The secondary noise signal is then combined with the undesirable noise acoustically within the air of the environment, causing destructive interference with at least a portion of the undesirable noise. The combined acoustic wave in the environment is often monitored to determine any error signal between the undesirable noise and the secondary noise signal. Such an error signal represents the difference between the two noise signals, and thus indicates that a portion of the undesirable noise is not being canceled. The error signal can then be used to provide feedback to adjust the secondary noise signal to thus more effectively eliminate the undesirable noise.

In many cases, ANC systems have been somewhat successful for sound attenuation of frequencies below about 500 Hz. One of the earliest and simplest control algorithms developed was the least-mean-squares (LMS) algorithm. The LMS algorithm is based on a gradient descent approach that operates by adjusting the values of an adaptive finite impulse response (FIR) filter until the minimum mean squared error signal is obtained. The original LMS algorithm was not practical for acoustic applications because it did not account for the effects of the physical propagation of the control signal.

A related algorithm that accounts for the effects of the physical propagation, also known as the secondary path, is known as the filtered-x LMS (FXLMS) algorithm. This algorithm uses a reference signal input filtered with a FIR filter representing an estimate of the impulse response of the secondary path. In the frequency domain, this FIR filter would represent the transfer function of the secondary path. This secondary path estimate may include effects of digital-to-analog converters, reconstruction filters, audio power amplifiers, loudspeakers, the acoustic transmission path, error sensors, signal conditioning, anti-alias filters, analog-to-digital converters, etc. Although the FXLMS algorithm has been shown to be successful for some applications, it exhibits frequency dependant convergence and tracking behavior that may lead to significant degradation in the overall performance of the control system in some situations. The performance degradation is particularly evident for situations involving non-stationary noise where the target noise is likely to take on every frequency in the range where control is possible. One example of such non-stationary noise occurs in the cab of a tractor, where noise frequencies fluctuate with the tractor engine. In these cases, less attenuation is seen at the frequencies where the convergence of the algorithm is slow. Various other algorithms have been attempted, however most of these approaches either increase the computational burden of the algorithm, increase the complexity of the algorithm, or are only effective for specific applications. A second example where performance degradation occurs is noise characterized by multiple tones in the noise signal. One example of such noise occurs in the cabin of a helicopter, where tones corresponding to the engine speed, main rotor, and tail rotor exist simultaneously. In general, convergence of the algorithm is slow at one or more of these frequencies.

SUMMARY OF THE INVENTION

Accordingly, the present invention provides methods for modeling the secondary path of an ANC system to improve convergence and tracking during noise control operation. In one aspect, for example, a method for modeling a secondary path for an active noise control system is provided. Such a method may include receiving a reference signal, filtering the reference signal with an initial secondary path model to obtain a filtered reference signal, calculating an autocorrelation matrix from the filtered reference signal, and calculating a plurality of eigenvalues from the autocorrelation matrix. The method may further include calculating a maximum difference between the plurality of eigenvalues and iterating a test model to determine an optimized secondary path model having a plurality of optimized eigenvalues that have a minimized difference that is less than the maximum difference of the plurality of eigenvalues, such that the optimized secondary path model may be utilized in the active noise control system.

A variety of iteration methods are contemplated, all of which would be considered to be within the present scope. In one aspect, for example, iterating the test model may further include generating a plurality of adjusted secondary path models, filtering the reference signal with each of the plurality of adjusted secondary path models to obtain a plurality of adjusted filtered reference signals, calculating a plurality of adjusted autocorrelation matrixes from the plurality of adjusted filtered reference signals, and calculating a plurality of adjusted eigenvalues from each of the adjusted autocorrelation matrixes. The method may further include calculating an adjusted maximum difference for each plurality of adjusted eigenvalues and selecting the optimized secondary path model from the plurality of adjusted secondary path models. In this case the optimized secondary path model is capable of generating the plurality of optimized eigenvalues.

Numerous methods are also contemplated for calculating the maximum difference across a plurality of eigenvalues. In one aspect, for example, calculating the maximum difference may further include calculating the span of the plurality of eigenvalues. In another aspect, calculating the maximum difference may further include calculating the root mean square of the plurality of eigenvalues. In yet another aspect, calculating the maximum difference may further include calculating the crest factor of the plurality of eigenvalues.

In another aspect of the present invention, a method for modeling a secondary path for an active noise control system is provided. Such a method may include obtaining an initial secondary path model and calculating an updated secondary path model that maintains phase of the initial secondary path model, but equalizes the magnitude of the initial secondary path model.

A wide variety of techniques are contemplated for calculating an updated secondary path model, depending on the level of noise control required, the complexity of the noise, and the characteristics of the noise environment. In one aspect, for example, calculating an updated secondary path model may include obtaining an initial time domain impulse response of the physical or initial secondary path model, calculating a Fast Fourier Transform (FFT) of the time domain impulse response, dividing the FFT response at each frequency by the magnitude of the response at that frequency and multiplying by the FFT's mean value, and calculating an inverse FFT to obtain an optimized time domain impulse response for use as the updated secondary path model. In another aspect, calculating an updated secondary path model may include obtaining an initial time domain impulse response of the physical or initial secondary path model, calculating a Fast Fourier Transform (FFT) of the time domain impulse response, dividing the FFT response at each frequency by the magnitude of the response at that frequency and multiplying by the inverse of the amplitude of the reference signal at that frequency, and calculating an inverse FFT to obtain an optimized time domain impulse response for use as the updated secondary path model.

The present invention also provides methods for utilizing secondary path models derived by the techniques of the present invention. In one aspect, for example, a method of actively minimizing noise in a system may include receiving a reference signal from a working environment, and filtering the reference signal with an optimized secondary path model obtained as described herein to produce a filtered reference signal. The method may further include filtering the reference signal with an adaptive control filter to generate a control output signal, introducing the control output signal into the working environment to minimize noise associated with the reference signal, and adjusting the adaptive control filter with the filtered reference signal.

There has thus been outlined, rather broadly, various features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

DETAILED DESCRIPTION OF THE INVENTION

Definitions

Figure 1:
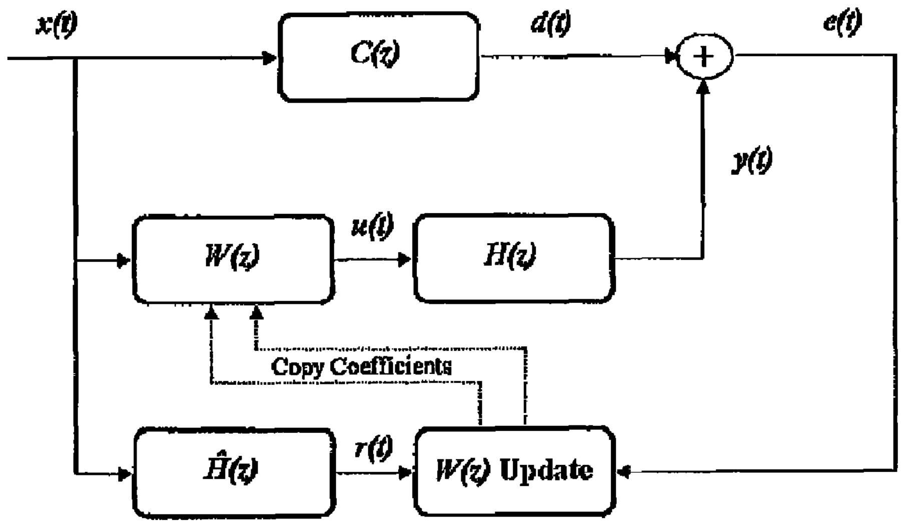
FIG. 1 is a schematic diagram of an ANC system incorporating a FXLMS algorithm in accordance with one embodiment of the present invention.

In describing and claiming the present invention, the following terminology will be used in accordance with the definitions set forth below.

The singular forms "a," "an," and, "the" include plural referents unless the context clearly dictates otherwise. Thus, for example, reference to "a filter" includes reference to one or more of such filters, and reference to "model" includes reference to one or more of such models.

As used herein, the term "secondary path" refers to the effects or an estimate of the effects of the physical propagation of a signal. The secondary path may include effects of digital-to-analog converters, reconstruction filters, audio power amplifiers, loudspeakers, the acoustic transmission path, error sensors, signal conditioning, anti-alias filters, analog-to-digital converters, etc.

As used herein, the term "adaptive filter" refers to a filter that self-adjusts its transfer function according to an optimizing algorithm.

As used herein, the term "noise" refers to unwanted acoustic or vibration energy in a system that is capable of being attenuated or removed by ANC methods.

As used herein, the term "equalize" refers to a process of decreasing the difference between two or more values. Thus equalized values may be truly equal, or they may merely have less difference between them as compared to before the equalization process.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

The Invention

A new approach has now been developed that largely overcomes the frequency dependent performance of many ANC algorithms. This approach has a low computational burden, and can be implemented in nearly any ANC algorithm that utilizes an adaptive filter to compensate for the effects of the secondary path. Although the following discussion focuses on FXLMS algorithms in order to more fully describe the concepts presented herein, it should be understood that the scope of the present claims is intended to cover all ANC algorithms for which these techniques would be useful.

The active control of noise for many systems requires the ability to track and control a signal that changes in frequency or to control a signal that consists of multiple tonal frequencies. For example, in the case of tractor noise the frequency of the noise signal changes as the speed of the engine changes during operation. One common ANC approach is based on a version of the FXLMS algorithm. For this algorithm, convergence and tracking speed are functions of the frequency dependent eigenvalues of the filtered-x autocorrelation matrix. To maintain stability, the system must be implemented based on the slowest converging frequency that will be encountered. In other words, the speed of convergence is limited by the slowest converging frequency to avoid instability. This often leads to significant degradation in the overall performance of the control system. The techniques presented herein provide an approach which largely overcomes this frequency dependent performance, maintains a relatively simple control implementation, and improves the overall performance of the control system.

In one aspect, a feedforward implementation of the FXLMS algorithm involves adaptive signal processing to filter the reference signal in such a way that the measured residual noise is minimized. The general FXLMS algorithm will now be described to provide an appropriate level of understanding of many of the issues associated with the secondary path. As has been described, FXLMS algorithms that are discussed herein are intended to be exemplary, and the present scope should not be limited to such.

In one exemplary aspect, a feedforward implementation of the FXLMS algorithm may be used which relies on a reference signal being "fed" forward to the control algorithm so that it can predict in advance the control signal needed to attenuate the unwanted noise. A block diagram of one embodiment of a FXLMS algorithm is shown in FIG. 1, where d(t) is the "desired" signal or signal to be attenuated, y(t) is the output signal, u(t) is the control signal, x(t) is the reference signal, e(t) is the error signal, r(t) is the filtered-x signal, C(z) is the transfer function relating the reference signal to the desired signal, W(z) is the adaptive filter, H(z) is the actual secondary path, and $\hat{H}(z)$ is the secondary path estimate. It should be noted that in all equations presented, the variable t is used as a discrete time index and the variable z is used as a discrete frequency domain index. The intended function of this algorithm is to reduce the mean-squared value of the error signal at a location where the sound is to be minimized by adaptively updating W(z), a vector containing control coefficients of a finite impulse response (FIR) filter.

The FXLMS algorithm functions as follows: for each iteration, W(z) takes a step size of μ, the convergence coefficient, times the negative gradient of the squared error signal in search of a single global minimum that represents the smallest attainable mean-squared value of the error signal. The adaptive FIR control filter update equation for w can be expressed in vector notation as is shown in Equation (1):

$$w(t+1)=w(t)-\mu e(t)r(t) \tag{1}$$

where e(t) is the error signal and r(t) and w(t) are defined as shown in Equations (2) and (3):

$$r^T(t)=[r(t),r(t-1), \ldots , r(t-I+1)] \tag{2}$$

$$w^T(t)=[w_0,w_1, \ldots , w_{I-1}]. \tag{3}$$

The filtered-x signal, r(t), is the convolution of $\hat{h}(t)$, the estimate of the secondary path transfer function, and x(t), the reference signal. The secondary path transfer function is represented as an impulse response that includes the effects of digital-to-analog converters, reconstruction filters, audio power amplifiers, loudspeakers, the acoustical transmission path, error sensors, signal conditioning, anti-alias filters, analog-to-digital converters, etc. As has been stated, this secondary path transfer function has a large effect on the performance of the algorithm.

For proper operation of the FXLMS algorithm, a model of the secondary path, represented by H(z) in FIG. 1, is needed, and therefore an estimate of the secondary path ($\hat{H}(z)$) must be used. Although a variety of techniques are possible, in one aspect this estimate may be obtained through a system identification (SysID) process. The SysID process to obtain the secondary path estimate is performed either online while ANC is running, or offline before ANC is started. For the fastest convergence of the algorithm, an offline approach may be used. The offline SysID process is accomplished by playing white noise through a control speaker and measuring the response at an error sensor. The estimate is the FIR filter, $\hat{h}(t)$, which represents $\hat{H}(z)$. Once obtained, the secondary path estimate is used to create the filtered-x signal r(t), which is in turn used to update the adaptive filter W(z). The reference signal is then filtered with the control coefficients of the adaptive filter to produce the control signal.

The inclusion of $\hat{H}(z)$ is necessary for algorithm stability, but it degrades performance by slowing the algorithm's convergence. Lower convergence rates and instability are directly related to errors in the estimation of the secondary path transfer function. Two types of errors that may be made in the estimation of the secondary path transfer function include errors in the amplitude estimation and errors in the phase estimation. Magnitude estimation errors will alter the maximum stable value of the convergence coefficient through an inverse relationship, and phase estimation errors greater than about +/−90° result in algorithm instability. Thus, magnitude errors tend to be less critical than phase errors, as magnitude errors can be compensated for in the value of the convergence coefficient used with the adaptive filters.

Additionally, the convergence coefficient μ often must be selected for each application. Several factors affect the selection of μ, including the number of control sources and sensors, the time delay in the secondary path, the digital filter length, system amplifier gains, the type of noise signal to be controlled (e.g. random or tonal), the estimate of the secondary path transfer function, etc. An estimate for the largest value of the convergence coefficient that would maintain the stability of the system may be accomplished via the eigenvalues of the filtered reference signal autocorrelation matrix.

The eigenvalues of the autocorrelation matrix of the filtered-x signal relate to the dynamics or time constants of the modes of the system. Typically, a large spread is observed in the eigenvalues of this matrix, corresponding to fast and slow modes of convergence. The slowest modes limit the performance of the algorithm because it converges the slowest at these modes. The fastest modes have the fastest convergence and the greatest reduction potential, but limit how large of a convergence parameter, μ, can be used. As has been described, for stability μ is set based on the slowest converging mode (the maximum eigenvalue), leading to degraded performance. If μ is increased, the slower states will converge faster, but the faster states will drive the system unstable.

One example of an autocorrelation matrix definition is shown in Equation (4), where E denotes the expected value of the operand which is the filtered-x vector signal, r(t), multiplied by the filtered-x signal vector transposed, $r^T(t)$.

$$E\{r(t)r^T(t)\} \tag{4}$$

In general, it has been shown that the algorithm will converge (in the mean) and remain stable as long as the chosen μ satisfies Equation (5):

$$0 < \mu < \frac{2}{\lambda_{max}} \tag{5}$$

where $\lambda_{max}$ is the maximum eigenvalue of the autocorrelation matrix in the range of frequencies targeted for control.

Figure 2:
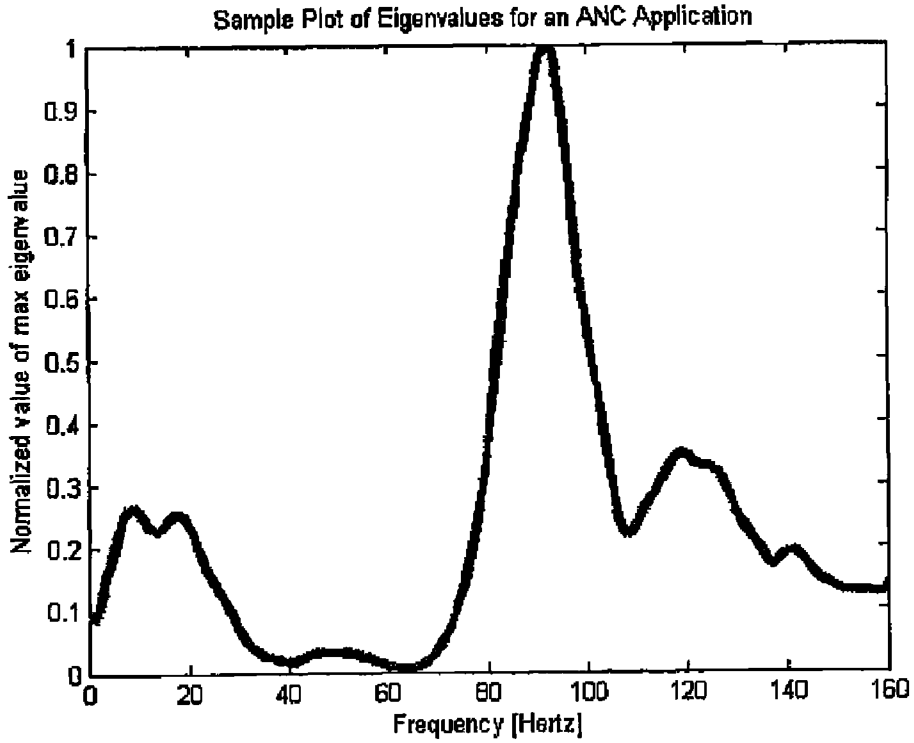
FIG. 2 is a graphical plot of data for a sample ANC application in accordance with another embodiment of the present invention.

The eigenvalues of the autocorrelation matrix dictate the rate of convergence of each frequency in the reference signal. The maximum stable convergence coefficient that can be used for ANC is the inverse of the maximum eigenvalue for all frequencies to be controlled. Disparity in the eigenvalues forces some frequencies to converge rapidly and others to converge more slowly. An example plot of the maximum eigenvalues at each frequency for a sample ANC application is shown in FIG. 2. The data for the graph were computed by calculating the maximum eigenvalue from the autocorrelation matrix for tonal inputs from 0-160 Hz. As is shown in FIG. 2, the maximum eigenvalue varies at each frequency. As such, the system will converge more quickly at some frequencies and more slowly at other frequencies. While the fastest convergence rate of the system occurs at the frequency having the smallest eigenvalue, it cannot be used due to system instability at other frequencies. System instability may be avoided by using the convergence rate at the frequency having the largest eigenvalue. The slowest convergence rate of the system is often referred to as the maximum convergence rate because it is the fastest rate that assures system stability.

By minimizing the variance in the eigenvalues of the autocorrelation matrix a single convergence parameter could be chosen that would lead to a uniform convergence rate over all frequencies. The autocorrelation matrix is directly dependent on the filtered-x signal r(t), which is computed by filtering the input signal with the secondary path transfer function. Changes to the autocorrelation matrix may stem from changes to the secondary path transfer function, changes to the input reference signal, or both. As was described above, variance in modeling the magnitude of the secondary path transfer function can be compensated for with adaptive filters, but phase errors in excess of 90° lead to system instabilities.

Accordingly, the present invention provides methods useful in modeling the secondary path that equalize the magnitude of the secondary path model while substantially maintaining phase. In one aspect, for example, a method for modeling a secondary path for an active noise control system may include obtaining an initial secondary path model and calculating an updated secondary path model that maintains phase of the initial secondary path model, but equalizes the magnitude of the initial secondary path model. Such changes may be made to the magnitude of the secondary path, the input reference signal, or both while preserving phase information. Essentially an all-pass filter of the same phase characteristic as that of $\hat{H}(z)$ is utilized.

A variety of methods for equalizing magnitude while maintaining phase are contemplated, and any such method should be considered to be within the scope of the present invention. In one aspect, for example, calculating an updated secondary path model may further include obtaining a time domain impulse response of the initial secondary path model, calculating a Fast Fourier Transform (FFT) of the time domain impulse response, equalizing the magnitude of the FFT response, and calculating an inverse FFT to obtain an optimized time domain impulse response for use as the updated secondary path model. Obtaining a time domain impulse response may be accomplished by any technique known, including the SysID system described herein. Additionally, the basic techniques of FFTs and their uses are well known in the art, and will not be discussed in detail.

Figure 3:
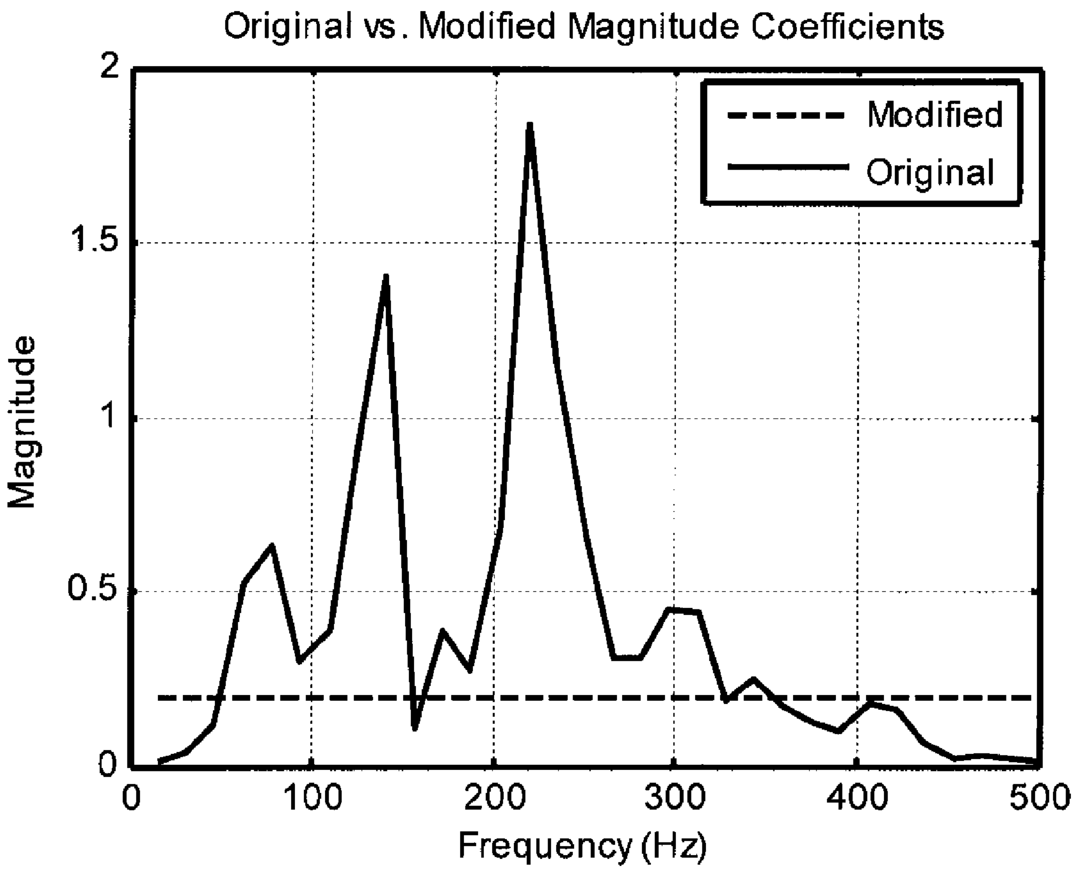
FIG. 3 is a graphical plot of data for a sample ANC application in accordance with yet another embodiment of the present invention.
Figure 4:
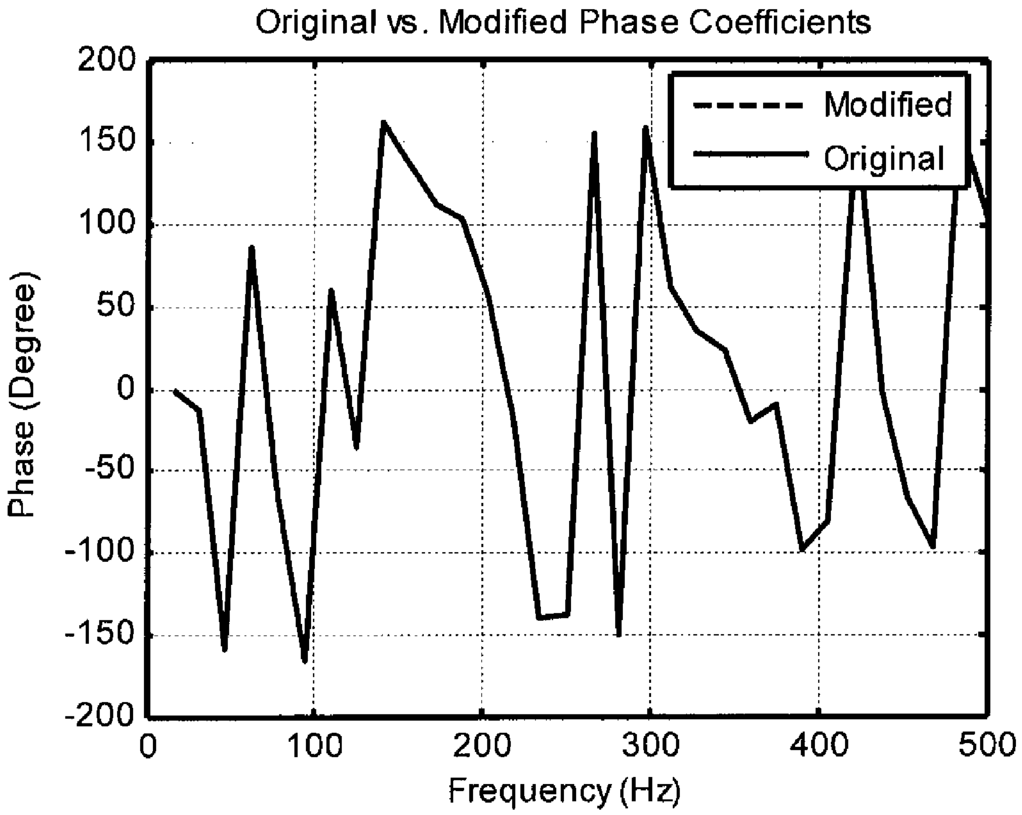
FIG. 4 is a graphical plot of data for a sample ANC application in accordance with a further embodiment of the present invention.

Numerous methods of equalizing the magnitude of the FFT response are also contemplated, and a particular method choice may vary depending on the intended results of the ANC system and the type of noise being controlled. For example, in one aspect the secondary path transfer function model may be flattened by dividing the FFT response at each frequency by the magnitude of the response at that frequency and multiplying by the FFT's mean value. This procedure flattens the magnitude coefficients of $\hat{H}(z)$ while preserving the phase. If using multiple channel and/or energy density (ED) control, the process is repeated for each $\hat{h}(t)$ estimate. In general there will be one $\hat{h}(t)$ for each channel for squared pressure control and three for each channel for ED control with a 2D error sensor (one for pressure, one for each of two velocity directions). It is an offline process done directly following SysID, and can be incorporated into any existing algorithm with only a few lines of code. As an offline process, it adds no computational burden to the algorithm when control is running. The results of the flattening process can be seen in exemplary data shown in FIGS. 3 and 4. FIG. 3 shows the original and modified $\hat{H}(z)$ magnitude coefficients and FIG. 4 shows that the phase information of $\hat{H}(z)$ has been preserved. Note in FIG. 4 that the two lines representing the original and modified phase information of $\hat{H}(z)$ are directly on top of each other. This approach may be more effective in situations where the amplitude of each frequency in the reference input signal is substantially uniform.

In another aspect, the secondary path transfer function model may be adjusted to be the inverse of the reference input signal amplitude at each frequency. This may be accomplished by dividing the FFT response at each frequency by the magnitude of the response at that frequency and multiplying by the inverse of the amplitude of the reference signal at that frequency. This procedure functions to equalize the magnitude of the filtered-x signal while preserving the phase. This approach may be more effective in situations where the reference input signal is not uniform as a function of frequency.

The above methods only equalize amplitude, however, at the frequencies present in the FFT. As such, there may be significant amplitude variations between the FFT frequencies that are not equalized by the methods described. Such amplitude variations can be eliminated through an iterative process to determine an optimized secondary path model capable of generating substantially equalized eigenvalues. Accordingly, in one aspect a method for modeling a secondary path for an active noise control system is provided. Such a method may include receiving a reference signal, filtering the reference signal with an initial secondary path model to obtain a filtered reference signal, calculating an autocorrelation matrix from the filtered reference signal, calculating a plurality of eigenvalues from the autocorrelation matrix, and calculating a maximum difference between the plurality of eigenvalues. Once the maximum difference has been calculated, a test model may be iterated to determine an optimized secondary path model having a plurality of optimized eigenvalues that have a minimized difference that is less than the maximum difference of the plurality of eigenvalues. Subsequently, the optimized secondary path model may be utilized in the active noise control system.

A variety of methods for accomplishing the iteration procedure are contemplated, and all would be considered to be within the scope of the present invention. In one specific aspect, however, iterating the test model may be accomplished as follows: a plurality of adjusted secondary path models is generated that are each subsequently used to filter the reference signal to obtain a plurality of adjusted filtered reference signals. The plurality of adjusted secondary path models may be generated prior to filtering the reference signal, or the reference signal may be filtered by each adjusted secondary path model as it is generated. An adjusted autocorrelation matrix is then calculated from each of the adjusted filtered reference signals, and a plurality of eigenvalues is calculated for each of the adjusted autocorrelation matrixes. An adjusted maximum difference is then calculated for the plurality of adjusted eigenvalues corresponding to each adjusted secondary path model. An optimized secondary path model is then selected from the plurality of adjusted secondary path models based on the maximum difference between the eigenvalues. This process is iterated until an optimal solution is obtained. In some aspects, such a process may be a genetic search algorithm. An optimized secondary path model may thus be obtained having a plurality of eigenvalues that are substantially equalized for a particular noise environment, and thus an optimal convergence rate will be accomplished when utilized in the ANC algorithm.

The selection of an optimized secondary path model may vary depending on the particular circumstances surrounding the ANC system and the noise being attenuated. In many cases, however, it may be beneficial to select the secondary path model that generates a plurality of eigenvalues having the smallest maximum difference of all of the pluralities of eigenvalues. It should be noted, however, that it may be difficult to obtain the absolutely smallest maximum difference, and therefore a close approximation may be necessary. Additionally, in some aspects it may be beneficial to select an optimized secondary path model that produces adequate ANC for a particular system, whether or not the absolute smallest maximum difference has been found. Adequate ANC may include situations where the noise is attenuated below the level of human hearing, or a level that is below the threshold for detrimental effects associated with noise.

In one method of iterating to determine an optimal secondary path model, a genetic search algorithm may be used. In such a method, several steps are implemented for each iteration of the algorithm. The phase of the initial transfer function model may be retained in a phase vector, and the magnitude can be used as the coding vector for the genetic algorithm. An initial population of designs of size N may be generated by randomly assigning an allowed value to each gene (magnitude coefficient) of this coding vector. The fitness of each design of the population may be evaluated by taking the inverse FFT of each design to get a new impulse response model and using that model with the reference signal to generate a new filtered reference autocorrelation matrix, from which the eigenvalues associated with that autocorrelation matrix can be determined. "Parents" for the next generation may be chosen through a tournament selection process and these parents may be selected to make N children; a set of two parent designs producing a single child design. Crossover may be implemented to exchange traits from each parent design, with blend crossover being one possible implementation. Random mutation may be implemented to maintain a controlled level of diversity. The fitness of the children may be evaluated, and elitism may be implemented where parents and children compete to become parents for the next generation. The process may be iterated enough times to converge to an optimal secondary path model.

A number of methods for determining the maximum difference between a plurality of eigenvalues are contemplated, and the present scope should not be limited to the exemplary techniques presented herein. In one aspect, for example, calculating the maximum difference may include calculating the span of the plurality of eigenvalues, as is shown in Equation (6):

$$\frac{\lambda_{max}}{\lambda_{min}} \tag{6}$$

where $\lambda_{max}$ is the maximum eigenvalue and $\lambda_{min}$ is the minimum eigenvalue of the autocorrelation matrix in the range of frequencies targeted for control. The closer to one the result, the smaller the minimized difference of the plurality of eigenvalues.

In another aspect, calculating the maximum difference may include calculating the root mean square of the plurality of eigenvalues, as is shown in Equation (7):

$$\sqrt{\langle\lambda^2\rangle} \tag{7}$$

where $\langle . \rangle$ denotes the arithmetic mean. The closer to one the result (assuming the eigenvalues have been normalized to a maximum value of one), the smaller the minimized difference of the plurality of eigenvalues.

In yet another aspect, calculating the maximum difference may include calculating the crest factor of the plurality of eigenvalues, as is shown in Equation (8):

$$\frac{\lambda_{max}}{\lambda_{rms}} \tag{8}$$

where $\lambda_{rms}$ is the root mean square of the plurality of eigenvalues of the autocorrelation matrix in the range of frequencies targeted for control. Equation (8) provides a calculation as to how close the root mean square value is to the peak maximum value. The closer to one the result, the smaller the minimized difference of the plurality of eigenvalues.

The present invention also provides methods for incorporating the optimized secondary path models into ANC systems. In one aspect, for example, a method of actively minimizing noise in a system may include receiving a reference signal from a working environment, and filtering the reference signal with an optimized secondary path model derived as described herein to produce a filtered reference signal. The reference signal is also filtered with an adaptive control filter to generate a control output signal, and the control signal is introduced into the working environment to minimize noise associated with the reference signal. The adaptive control filter may be adjusted with the filtered reference signal.

The optimized secondary path model can be fixed for the duration of the ANC processing, or it can be dynamically updated as noise conditions change. In one aspect, for example, the optimized secondary path model can be determined offline prior to the start of the ANC processing. In another aspect, the optimized secondary path model can be determined online during ANC processing. For such situations, the optimized secondary path may be determined initially online during ANC processing, or it may have been determined initially offline and merely updated during processing. Such updating may be a result of changes in the noise characteristics, changes in the environment, etc. For example, if the error difference between the control output signal and the reference signal increases, it may be beneficial to re-determine the optimized secondary path function to improve the noise control in the environment.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method for modeling a secondary path for an active noise control system, comprising:
- receiving a reference signal;
- filtering the reference signal with an initial secondary path model to obtain a filtered reference signal;
- calculating an autocorrelation matrix from the filtered reference signal;
- calculating a plurality of eigenvalues from the autocorrelation matrix;
- calculating a maximum difference between the plurality of eigenvalues;
- iterating a test model to determine an optimized secondary path model having a plurality of optimized eigenvalues that have a minimized difference that is less than the maximum difference of the plurality of eigenvalues, wherein the optimized secondary path model may be utilized in the active noise control system.

2. The method of claim 1, wherein iterating the test model further includes:
- generating a plurality of adjusted secondary path models;
- filtering the reference signal with each of the plurality of adjusted secondary path models to obtain a plurality of adjusted filtered reference signals;
- calculating a plurality of adjusted autocorrelation matrixes from the plurality of adjusted filtered reference signals;
- calculating a plurality of adjusted eigenvalues from each of the adjusted autocorrelation matrixes;
- calculating an adjusted maximum difference for each plurality of adjusted eigenvalues; and
- selecting the optimized secondary path model from the plurality of adjusted secondary path models, wherein the optimized secondary path model is capable of generating the plurality of optimized eigenvalues.

3. The method of claim 2, wherein the minimized difference is the smallest difference from all of the pluralities of adjusted eigenvalues.

4. The method of claim 1, wherein calculating the maximum difference further includes calculating the span of the plurality of eigenvalues.

5. The method of claim 1, wherein calculating the maximum difference further includes calculating the root mean square of the plurality of eigenvalues.

6. The method of claim 1, wherein calculating the maximum difference further includes calculating the crest factor of the plurality of eigenvalues.

7. The method of claim 1, wherein the secondary path is modeled offline.

8. The method of claim 1, wherein the secondary path is modeled online.

9. The method of claim 2, wherein selecting the optimized secondary path model further includes selecting the optimized secondary path model using a genetic search algorithm.

10. A method of actively minimizing noise in a system, comprising:
- determining an optimized secondary path model by:
  - receiving an initial reference signal;
  - filtering the initial reference signal with an initial secondary path model to obtain an initial filtered reference signal;
  - calculating an autocorrelation matrix from the initial filtered reference signal;
  - calculating a plurality of eigenvalues from the autocorrelation matrix;
  - calculating a maximum difference between the plurality of eigenvalues;
  - iterating a test model to determine the optimized secondary path model having a plurality of optimized eigenvalues that have a minimized difference that is less than the maximum difference of the plurality of eigenvalues;
- receiving a reference signal from a working environment;
- filtering the reference signal with the optimized secondary path model to produce a filtered reference signal;
- filtering the reference signal with an adaptive control filter to generate a control output signal;
- introducing the control output signal into the working environment to minimize noise associated with the reference signal; and
- adjusting the adaptive control filter with the filtered reference signal.

11. The method of claim 10, wherein the adaptive control filter is adjusted with the filtered reference signal prior to activation of active noise control.

12. The method of claim 10, wherein the adaptive control filter is adjusted with the filtered reference signal after activation of active noise control.

13. A method of actively minimizing noise in a system, comprising:

determining an optimized secondary path model by:

receiving an initial reference signal;

filtering the initial reference signal with an initial secondary path model to obtain an initial filtered reference signal;

calculating an autocorrelation matrix from the initial filtered reference signal;

calculating a plurality of eigenvalues from the autocorrelation matrix;

calculating a maximum difference between the plurality of eigenvalues;

iterating a test model to determine the optimized secondary path model having a plurality of optimized eigenvalues that have a minimized difference that is less than the maximum difference of the plurality of eigenvalues;

receiving a reference signal from a working environment;

filtering the reference signal with the optimized secondary path model to produce a filtered reference signal;

filtering the reference signal with an adaptive control filter to generate a control output signal;

introducing the control output signal into the working environment to minimize noise associated with the reference signal; and adjusting the adaptive control filter with the filtered reference signal.

14. The method of claim 13, wherein the adaptive control filter is adjusted with the filtered reference signal prior to activation of active noise control.

15. The method of claim 13, wherein the adaptive control filter is adjusted with the filtered reference signal after activation of active noise control.

* * * * *